Patented Apr. 29, 1952

2,594,302

UNITED STATES PATENT OFFICE 2,594,302

PROCESS FOR THE RECOVERY OF VALUABLE CONSTITUENTS FROM WASTE SULFITE LIQUOR

Hans Ehrensperger, Montreal, Quebec, Canada, assignor to St. Lawrence Paper Mills Company Limited, Montreal, Quebec, Canada No Drawing. Application August 22, 1949, Serial No. 111,767

4 Claims. (Cl. 260—124)

This invention relates to the recovery of commercially valuable products from liquors containing lignin and lignin sulphonic acid, such, for example, as the waste liquors resulting from the various chemical pulping processes employed in producing cellulose pulp from wood and other plant materials.

According to this invention, commercially valuable addition products useful as plastics and in various other relations are formed and precipitated by subjecting liquors containing lignin and lignin sulphonic acid to the action of reagents selected from the group consisting of quaternary ammonium bases and salts. These reagents react with the lignin and lignin sulphonic acid constituents of the liquor to form and precipitate addition products of a ligneous nature in which the lignin and lignin sulphonic acid constituents are combined with the quaternary ammonium reagent.

Depending upon the nature of the liquor, the selected reagent and the conditions of treatment, the products thus obtained may be used for various industrial purposes. Products obtained in accordance with this invention have been found to be useful in the manufacture of various types of plastics and for replacing, in whole or in part, the phenols used in the manufacture of Bakelite. They may also be used to replace, in whole or in part, higher priced substances, such, for example, as resorcinol, used in the manufacture of plastics. Products have also been obtained which are suitable for use as raw material for polymerisation and condensation to higher plastics.

In the present instance, the invention will be illustrated by selected examples dealing with the treatment of acid, alkaline and neutral liquors containing lignin and/or lignin sulphonic acid.

Reagents which have been successfully employed in accordance with the invention for recovering valuable ligneous products from various lignin-containing liquors include alkyl-tri-methyl-ammonium-chloride; cetyl-pyridinium-bromide; tetra-decyl-pyridinium-bromide; dimethyl - phenyl - benzyl - ammonium - chloride; cetyl-stear-amido-methyl-pyridinium-chloride; cetyl-tri-methyl-ammonium-bromide; lorol-tri-methyl-ammonium-bromide; tri-ethanol-benzyl-ammonium-chloride; benzyl-pyridinium-chloride; tri-ethyl-benzyl-ammonium-chloride; tri-ethanol - propyl - ammonium - chloride; tri-ethanol-ethyl-ammonium-ethyl-sulfate; alkyl-di-methyl-ammonium-chloride.

The class of quaternary ammonium compounds which may be employed in accordance with this invention is extremely large and includes many reagents in addition to those mentioned above. These compounds may be regarded as the counterpart of ammonium hydroxide and ammonium salts respectively. For example, ammonium chloride of the formula $NH_4Cl$ becomes a quaternary ammonium compound when all of its hydrogen atoms are replaced by organic groups or radicals. It will thus be apparent that, in view of the large number of different organic radicals available as substitutes for hydrogen atoms attached directly to a nitrogen atom, the number of compounds falling within the class of quaternary ammonium compounds contemplated by this invention is exceedingly numerous. In this connection, it may be noted that any organic group or radical which can be attached to amino or ammonium nitrogen without destroying its basicity may constitute one of the four N-substituents of a useful quaternary ammonium compound.

The general formula assigned to quaternary ammonium compounds is as follows:

$$NR_4.X$$

where $X$ is the anion and $NR_4$ is the cation. The anion may be an inorganic or organic acid radical or a hydroxide, etc.

The R. substituents of the cation may be homogeneous or heterogeneous in various combinations.

The lignin-quaternary ammonium compounds constituting the addition products produced in accordance with the invention will vary in colour, consistency, melting or softening point, solubility and other physical or chemical properties with variations in the selection of the reagent and in the type of lignin-containing liquor being treated. They may range in colour from pale buff or cream to dark brown or black. The colour characteristics are affected, at least in some cases, by the pH at which precipitation takes place. In a strong acid medium the quaternary ammonium reagent reacts with the lignin or lignin sulphonic acid to form and precipitate a very pale addition product, whereas, in an alkaline medium, a dark reaction or addition product is precipitated.

The addition products obtained in accordance with the invention are chemically active and seem to have an affinity for oxygen since they darken very rapidly when exposed to air. They therefore are distinctly different from lignin which is substantially inert. The consistency of the products obtained in accordance with the invention may vary from semi-hard, waxy substances to tacky or semi-fluid substances. In some instances, products are obtained which, when warm, are in the form of a very plastic mass which can be handled like putty. By removing the excess water, the putty-like mass may be transformed into a brittle material which can easily be pulverized to a powder which is relatively stable. A further valuable characteristic of the addition products obtained in accordance with this invention is their solubility in organic chemicals.

The reagents employed in accordance with the invention are selective in that, in lignin-containing liquors in which sugars, inorganic chemicals and other minor simple organic substances are present, the quaternary ammonium compound reacts with the lignin and lignin sulphonic acid constituents of the liquor leaving the other constituents of the liquor in solution. This enables the precipitated addition products and the other constituents of the treated liquor to be separated by simple filtration or decantation procedures. Since the addition products thus obtained are compounds of the quaternary ammonium material and lignin, their net weight is greater than the weight of quaternary ammonium compounds employed in the ratio of from approximately 2:1 to 4:1.

The invention is further illustrated by the following examples:

Example I

Freshly blown sulphite liquor at a temperature of approximately 180° F. was neutralized by the addition of calcium carbonate simultaneously with the blowing of air through the liquor to agitate same and to drive off excess $SO_2$. The pH was then adjusted to pH 5.8 by the addition of calcium hydroxide and the liquor was then allowed to cool to approximately room temperature. A quaternary ammonium salt solution in the form of alkyl-di-methyl-benzyl-ammonium-chloride was then added to the liquor until all precipitation ceased. The precipitate thus obtained was an excessively fine suspension, the particles of which were then caused to fuse together and be deposited on the bottom of the vessel in an easily handled, stringy, plastic mass by heating the liquor to a suitable temperature above 120° F., such, for example, as the temperature between 150° F. and 156° F. The mother liquor containing the sugars, organic salts, etc., was then separated from the precipitate by decantation. This mother liquor is a pale yellow from which the residual salts may be removed by well known ion or base exchange procedures. Colouring matter in the mother liquor may be removed by well known decolourizing agents used alone or in combination with oxidizing agents such, for example, as hydrogen peroxide.

Example II

Freshly drawn pit liquor is aerated for about 60 minutes to get rid of excess $SO_2$ and the pH is then adjusted to pH 7.4 by the addition of caustic. Addition products were then formed and precipitated by treating the liquor with the same quaternary ammonium reagent and in the same manner as is set forth in Example I.

Example III

Freshly drawn pit liquor with a pH of 2.3 was subjected to the action of the same quaternary ammonium reagent and in the same manner as described in Example I.

In the procedures illustrated in Examples I to III inclusive and in other procedures carried out in accordance with the invention, it appears that the separation of the lignin constituents from the sugars and other constituents of waste sulphite liquor by quaternary ammonium reagents employed is substantially complete. It is, of course, necessary to employ an excess of the quaternary ammonium reagent in order to ensure that a sufficient amount of the reagent is available for reaction with all of the lignin constituents of the liquor.

An important characteristic of the addition products or compounds obtained in accordance with the invention is that they may be decomposed or split into their principal constituents, namely, lignin and quaternary ammonium material, by various commercially feasible procedures. It will thus be evident that the invention may also be used primarily as a process for recovering and isolating lignin constituents from liquors containing same. In this case, the addition products formed and precipitated by the use of the quaternary ammonium reagents constitute intermediate products which, after being separated from the mother liquor, are split by decomposition into their main constituents, namely, lignin and quaternary ammonium material, the latter being recoverable in a form suitable for re-use in treating a fresh batch of lignin-containing liquor.

While the true nature of the addition products obtained in accordance with the invention is not fully understood, it has been found that their principal components, the lignin and quaternary ammonium material, are combined in such a way that they may be readily separated by various simple and economical procedures. For example, it has been found that by reacting the addition products with a strong mineral acid such as hydrochloric, sulphuric or phosphoric acid, at or around water bath temperature, the quaternary ammonium base is separated from the weaker acid represented by the lignin component. The extraction of the mineral acid leaves a residue of lignin and/or lignin-sulfonic acid which may be dissolved in weak alkalies to form a solution of the sodium salt of lignin sulfonic acid from which the lignin may be precipitated in substantially pure form by acidifying. In this decomposition procedure the quaternary ammonium base is separated from the lignin constituents in the form of the mineral salt of the corresponding acid used in the decomposition procedure. When recovered in this form and concentrated the quaternary ammonium material may be re-used for the treatment of a new batch of lignin-containing liquor. Alternately, the quaternary ammonium material may be freed from the mineral acid used in the decomposition procedure by reacting the acid salt with caustic alkalies.

The decomposition of the addition products obtained in accordance with this invention may also be accomplished by treating such products with strong caustic alkali at or around the neighborhood of water bath temperature. This causes the quaternary ammonium base to separate from the lignin constituents and to collect on the surface of the mixture in the form of an "oily" layer or "oily" droplets. As the reaction proceeds the solution gets darker indicating transformation of the lignin component into the soluble alkali lignin salt. When all of the constituents of the reaction product have passed into solution the separated quaternary ammonium base can be drawn off by decantation.

Alternately, an extractant not miscible with water may be added to shake out all of the quaternary ammonium base and thus effect satisfactory separation thereof from the lignin constituents. After evaporation of the solvent or extractant the free base is in condition for re-use.

The lignin which is separated, as a very dark brown liquid, from the quaternary ammonium material is the alkali salt of lignin-sulfonic acid from which the lignin may be precipitated in an insoluble form by acidification.

The solvent decomposition of the addition products obtained in accordance with this invention may also be accomplished by subjecting such products to the action of carbontetrachloride, kerosene, alcohols and other solvents for the quaternary ammonium base.

While the whole field of solvent extraction of the quaternary ammonium base has not been explored, the indications are that many suitable solvents may be found among the organic chlorides and hydrocarbons as well as among other classes of solvents. The sugar containing mother liquor, which is separated from the precipitated addition products obtained in accordance with the invention, may be used in its original form for use in the manufacture of alcohol, furfural and other industrial products. This mother liquor may also be treated, by ion exchange and other purifying procedures, to recover the sugars in a more purified form.

Having thus described the nature of my invention and several practical applications thereof, it will be understood that various modifications may be restored to within the scope and spirit of the invention as defined by the appended claims.

I claim:

1. The recovery of valuable nitrogen-containing constituents from ligneous liquors which comprises treating the liquor with a reagent selected from the class consisting of quaternary ammonium bases and salts and then separating the resulting precipitate from the mother liquor.

2. The recovery of lignin constituents from ligneous liquors by the process comprising subjecting the liquor to the action of a reagent selected from the group consisting of quaternary ammonium bases and salts to thereby form and precipitate addition products consisting of lignin constituents combined with quaternary ammonium material, separating the addition products from the mother liquor and then decomposing the addition products in isolate the lignin constituents from the quaternary ammonium material.

3. The recovery of lignin constituents from liquors containing lignin-sulphonic acid by the process comprising subjecting the liquor to the action of a reagent selected from the group consisting of quaternary ammonium bases and salts to thereby form and precipitate addition products comprising the reaction products of lignin and quaternary ammonium material.

4. As a new article of manufacture the reaction product of lignin and a reagent selected from the group consisting of quaternary ammonium bases and salts.

HANS EHRENSPERGER.

REFERENCES CITED

The following references are of record in the file of this patent:

UNITED STATES PATENTS

| Number | Name | Date |
|---|---|---|
| 2,379,889 | Dorland | July 10, 1945 |